A. L. McKELVEY.
AIRCRAFT.
APPLICATION FILED NOV. 4, 1914.
1,187,916.
Patented June 20, 1916.
8 SHEETS—SHEET 1.
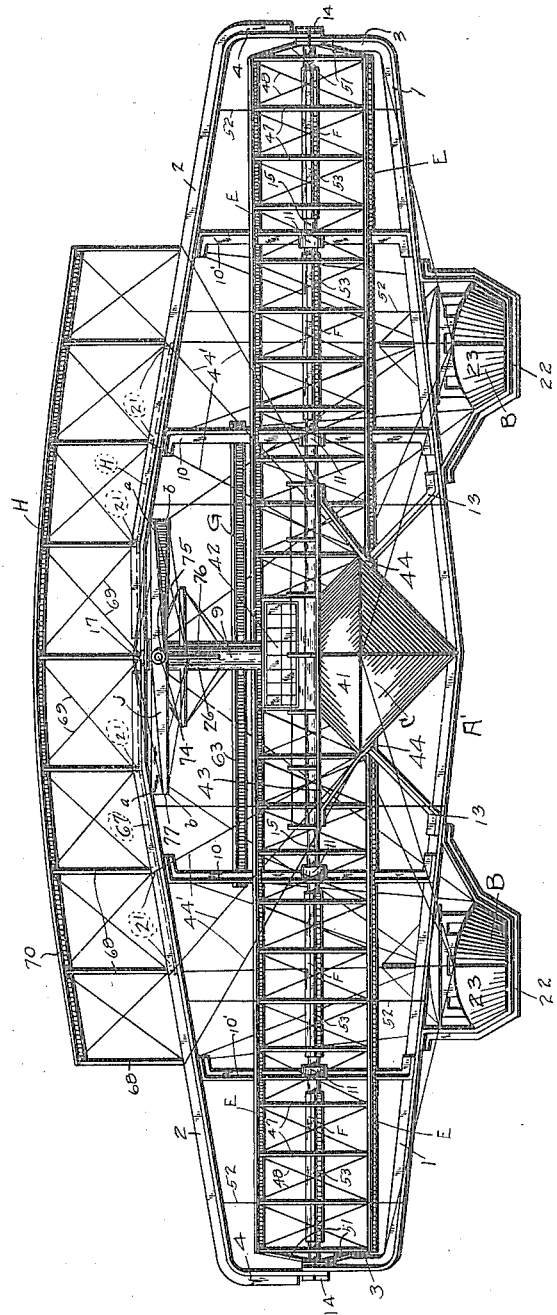
WITNESSES:
INVENTOR.
ARCHIEBALD L. McKELVEY
BY
ATTORNEY.

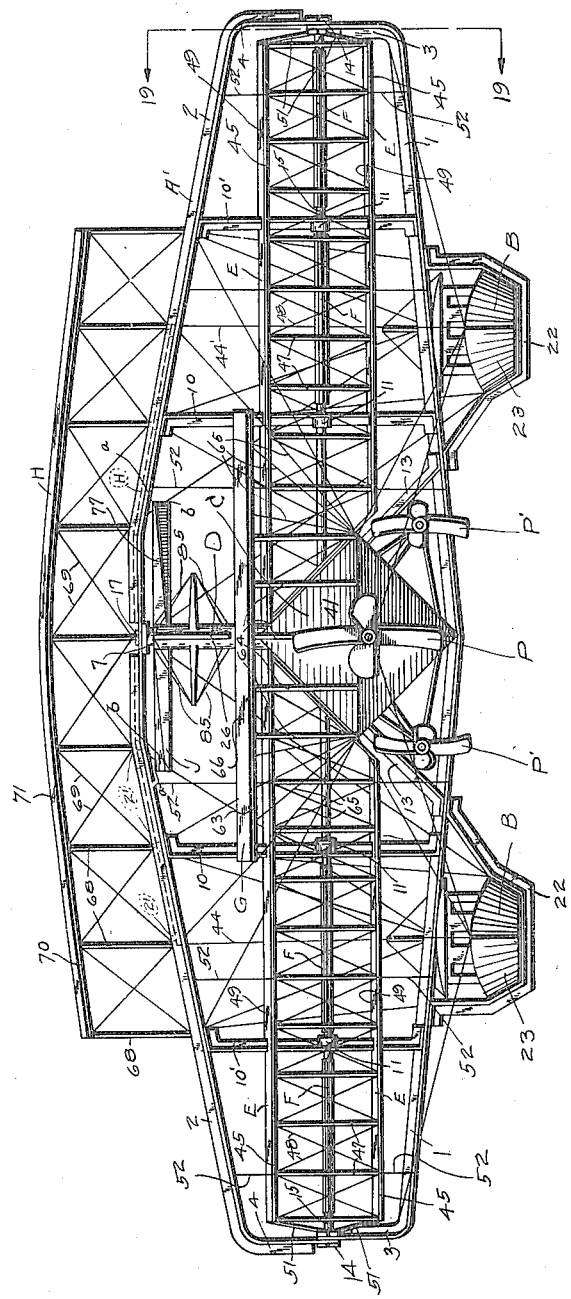

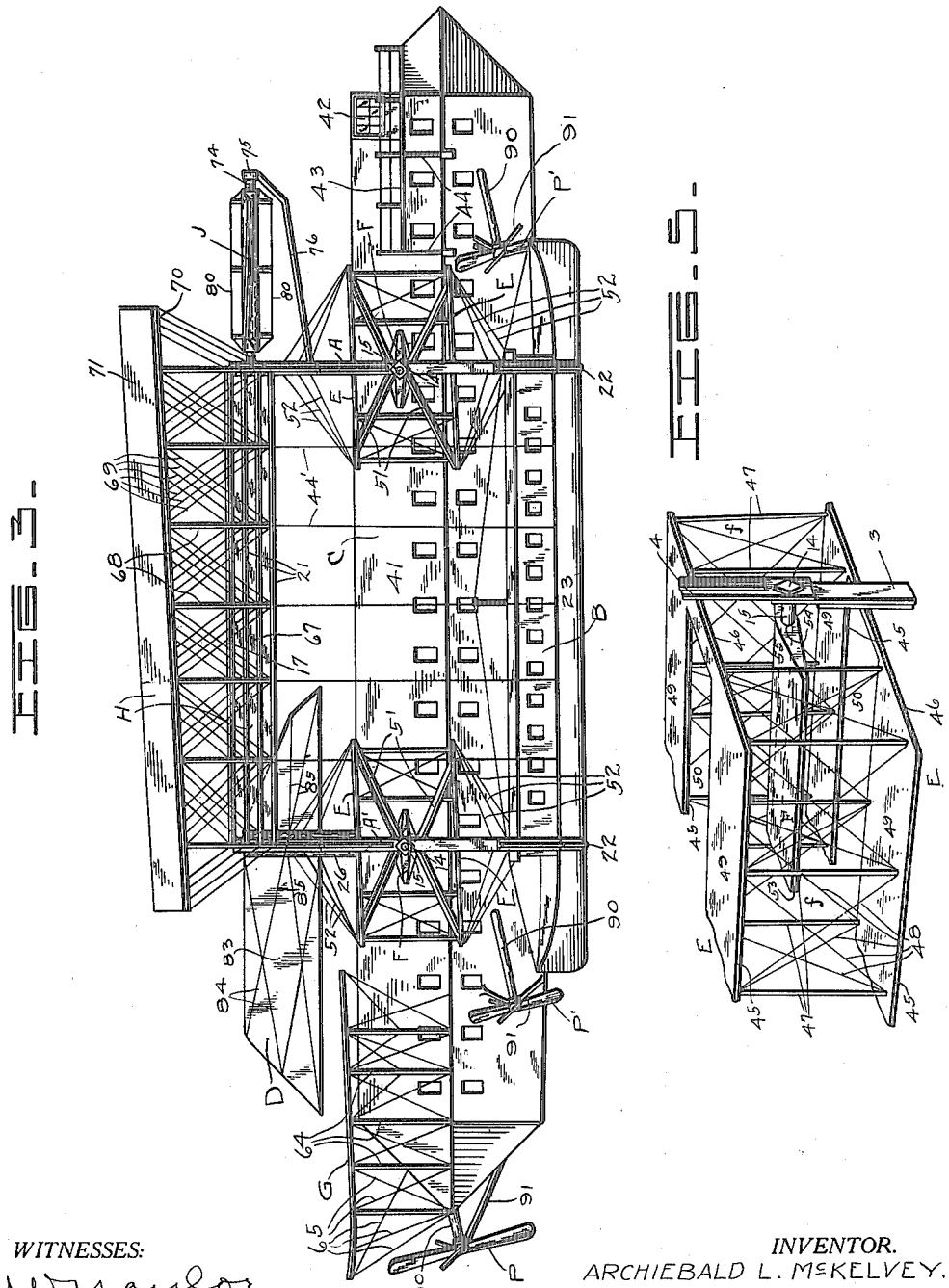

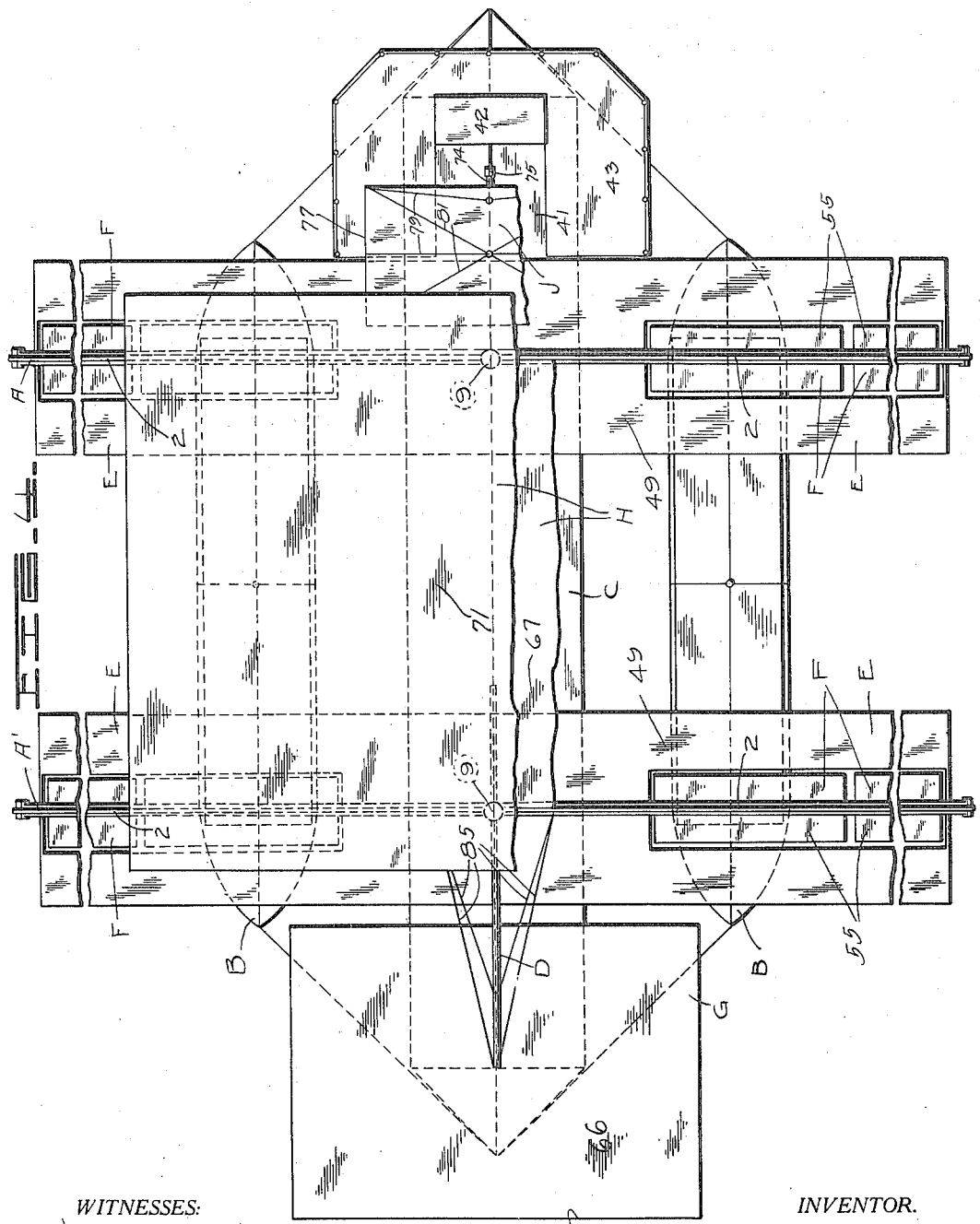

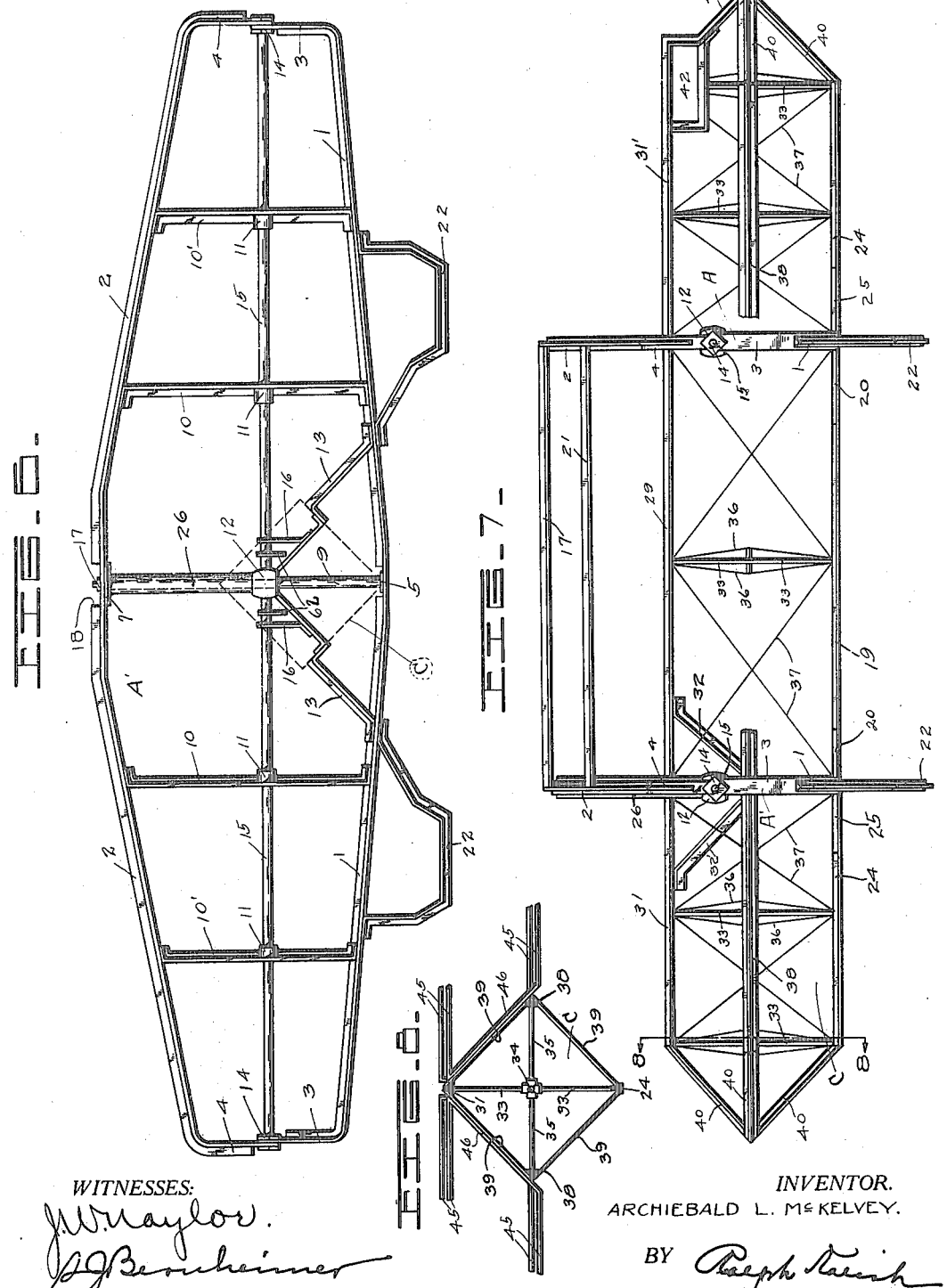

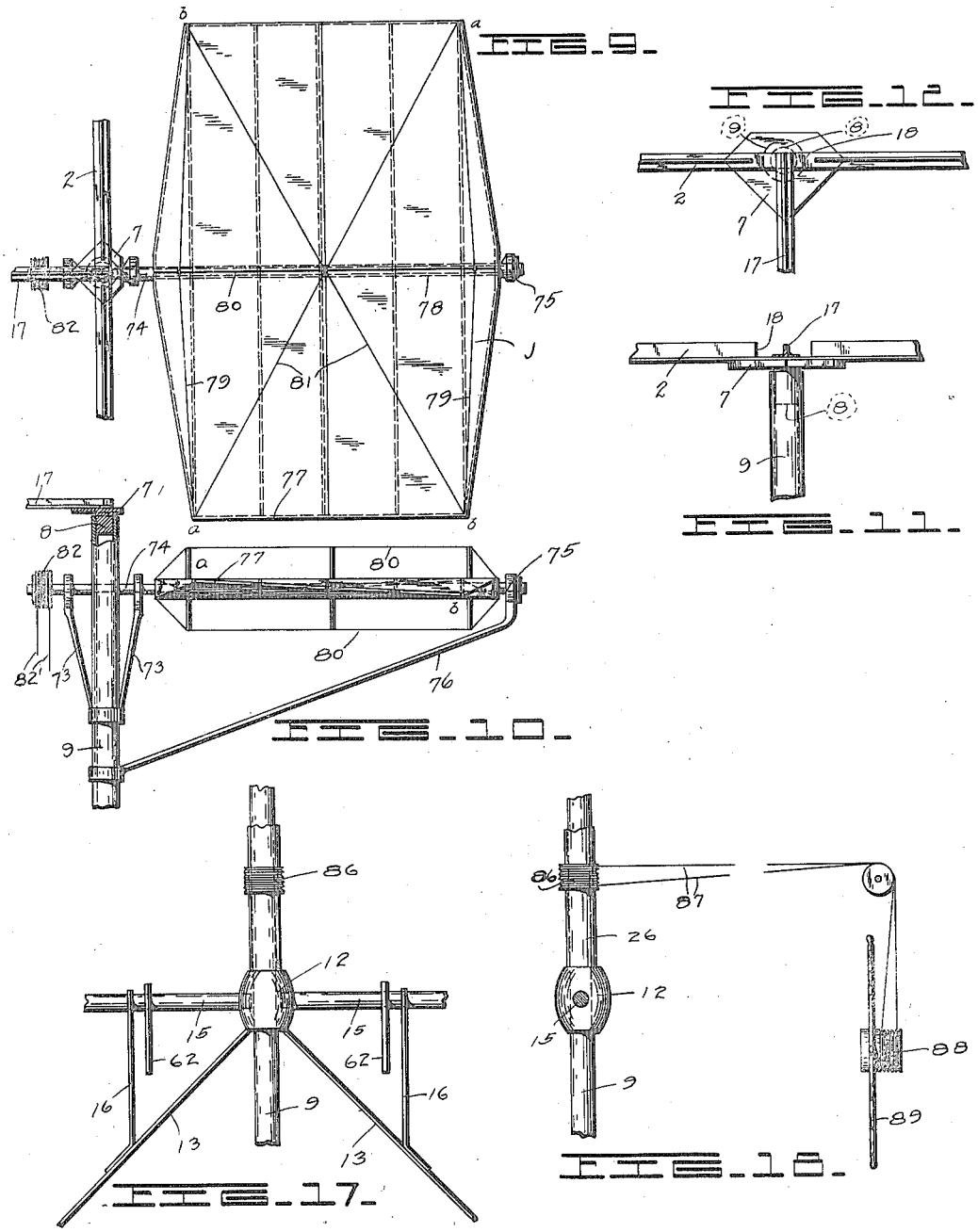

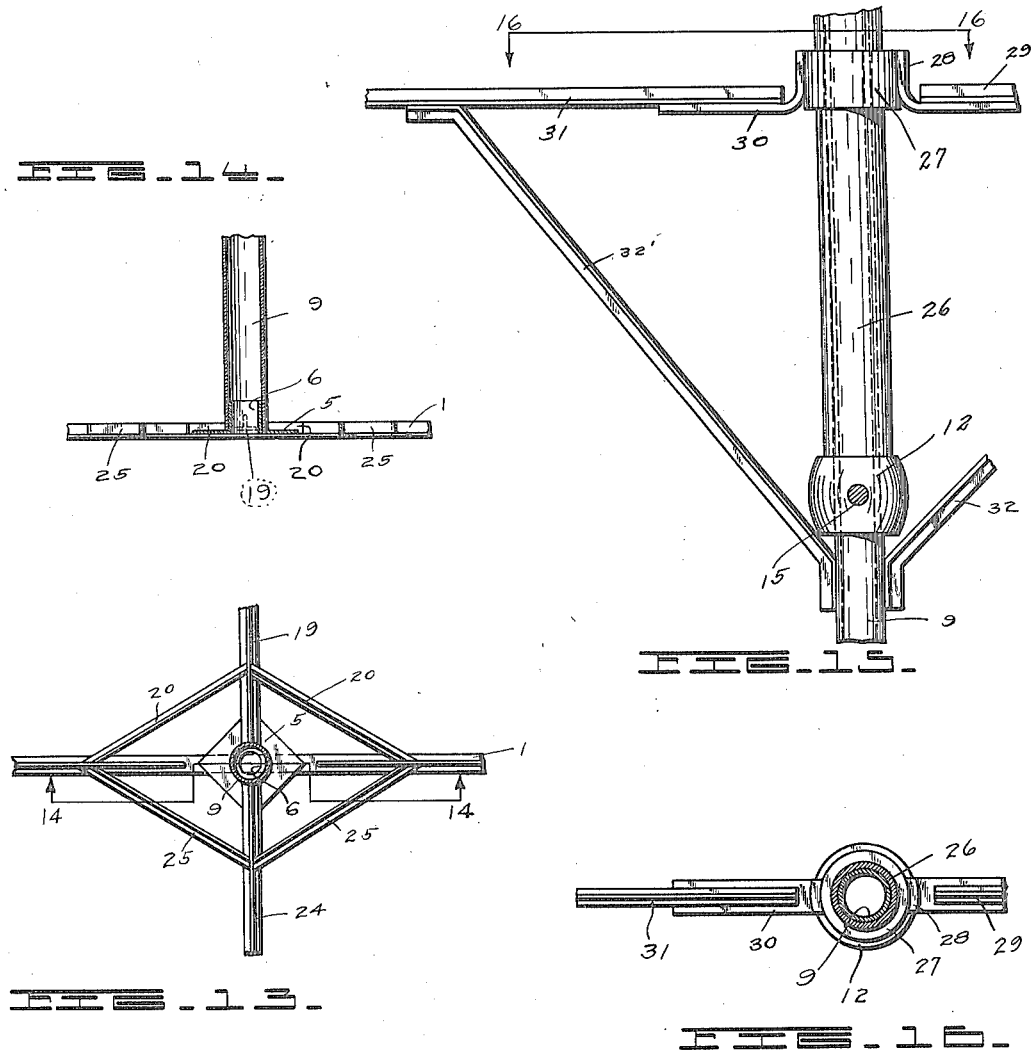

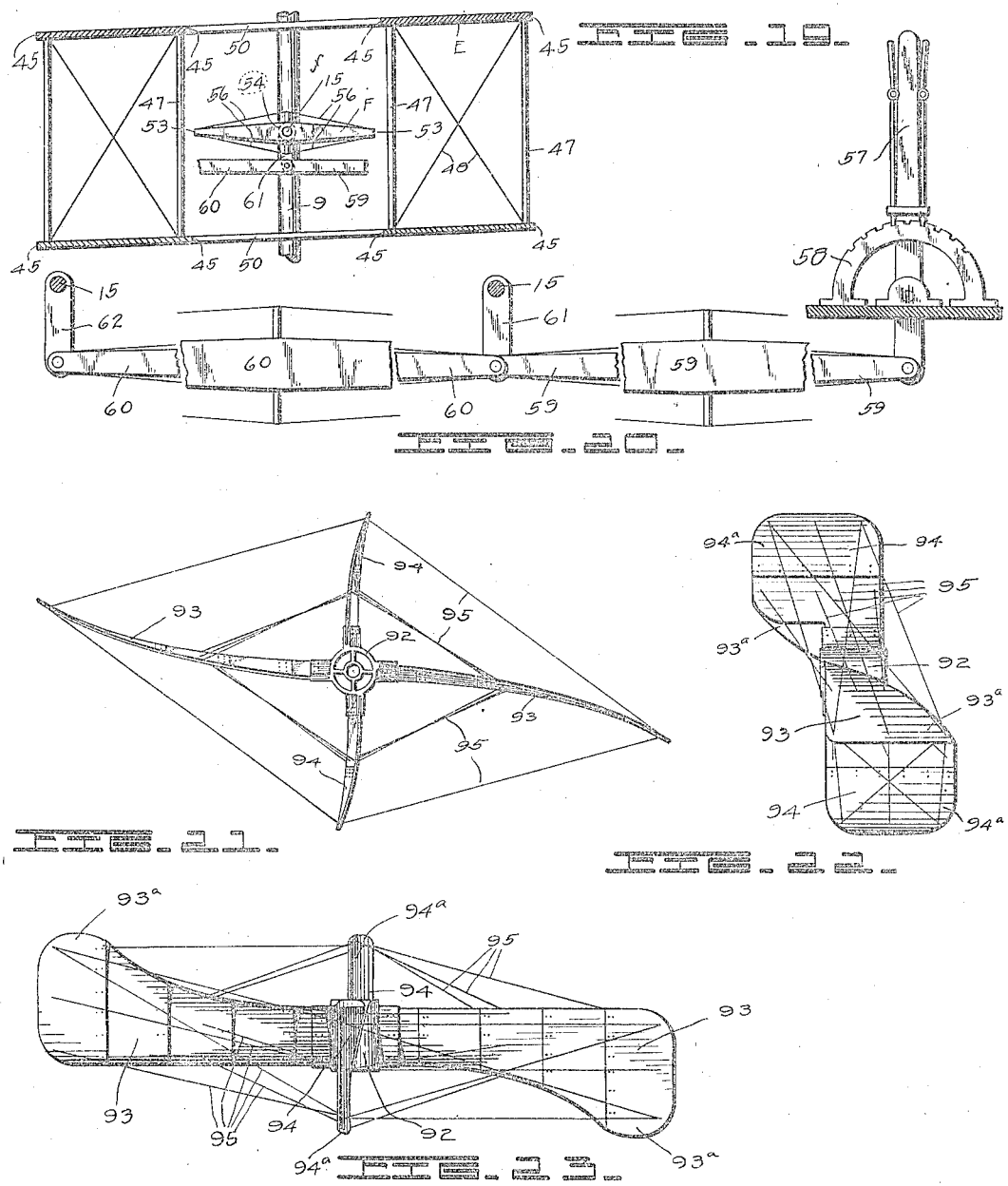

UNITED STATES PATENT OFFICE.

ARCHIEBALD L. McKELVEY, OF ST. LOUIS, MISSOURI.

AIRCRAFT.

1,187,916. Specification of Letters Patent. Patented June 20, 1916.

Application filed November 4, 1914. Serial No. 870,224.

*To all whom it may concern:*

Be it known that I, ARCHIEBALD L. MCKELVEY, a citizen of the United States, residing at the city of St. Louis, State of Missouri, have invented certain new and useful Improvements in Aircraft, of which the following is a specification, reference being had to the accompanying drawings, forming a part thereof.

This invention relates to air-craft and has for its object to improve generally upon aircraft as heretofore built and constructed, my invention residing in certain novel features of form, construction, arrangement, and combination of parts, all as will hereinafter be described and afterward pointed out in the claims.

In the accompanying drawings, which show the preferred embodiment of my invention, Figure 1 is a front elevational view of an air-craft embodying my invention; Fig. 2 is a rear elevational view of the same; Fig. 3 is a side elevational view thereof; Fig. 4 is an enlarged plan view of the same with parts broken away; Fig. 5 is an enlarged fragmentary perspective view of one of the fixed sustaining wings and of one of the elevating planes or rudders of the craft; Fig. 6 is an enlarged front view of the rear transverse main or body-frame of the craft, the wings and other parts of the craft being omitted; Fig. 7 is an enlarged side elevational view showing merely the main framework or body-portion of the craft partly broken away, the wings and other parts of the craft being also omitted; Fig. 8 is a transverse view through the main frame-work or body-portion of the craft on approximately the line 8—8, Fig. 7; Fig. 9 is a fragmentary plan view of the craft, showing merely the forward lateral balancing wing or rudder of the craft, as I have termed it; Fig. 10 is a side elevational view, partly in section, of the parts shown in Fig. 9; Fig. 11 is a detail elevational view of the upper central portion of one of the main or body-frames and its center-post or mast, showing the anchoring connection therebetween; Fig. 12 is a plan view of the parts shown in Fig. 11; Fig. 13 is a detail view of the lower central portion of one of the main or body-frames and its center-post or mast, showing the anchoring connection therebetween; Fig. 14 is a detail sectional view on approximately the line 14—14, Fig. 13; Fig. 15 is an enlarged fragmentary view showing the anchoring connections between the center-post or mast of the rear main or body-frame and certain of the main hull-members; Fig. 16 is a detail sectional view on approximately the line 16—16, Fig. 15; Fig. 17 is an enlarged fragmentary view showing a portion of the center-post or mast of the rear main or body-frame and of the means for oscillating the guiding or steering rudder and the elevating planes or wings of the craft; Fig. 18 is an enlarged fragmentary view similarly showing a portion of the center-post or mast of the rear main or body frame and of the means for actuating or oscillating the guiding or steering rudder of the craft; Fig. 19 is a cross-sectional view of one of the sustaining wings of the craft on approximately the line 19—19, Fig. 2; Fig. 20 is a side elevational view of the means for oscillating the elevating planes or wings of the craft; Fig. 21 is a rear plan view of one of the propellers preferably employed in my new air-craft; and Figs. 22 and 23 are side or edge elevational views of the same.

Referring to the said drawings, in which like reference characters refer to like parts throughout the several views, my new aircraft comprises a body-portion having two approximately similar main-frames A and A' disposed vertically transversely or laterally of the craft, as seen particularly in Figs. 1 and 3. Each of these frames has preferably the form or contour in front elevation shown particularly in Fig. 6 and includes a lower member 1 and an upper member 2. Lower member 1 is somewhat convexed or chambered from approximately its center to oppositely slope gently upwardly and adjacent its ends is bent to provide upwardly presented extensions 3—3, member 1 being preferably a T-bar with its web or flange presented upwardly and inwardly. Upper member 2 is also somewhat convexed or cambered from approximately its center to oppositely slope gently downwardly and adjacent its ends is bent to provide downwardly presented extensions 4—4, which are riveted or otherwise securely fixed to extensions 3—3 of member 1, member 2 being also preferably a T-bar with its web or flange presented upwardly and outwardly, as shown. The cambered members 1 and 2 perform the functions of upper and lower chords which combine with strut members hereinafter more fully described to form trusses which, in connection with other parts hereinafter more fully appearing, provide a very light, strong, and durable skeleton frame-work for the craft or machine. Centrally or approximately midway its length, lower member 1 has fixed thereto on its upper side a plate or casting 5 having an upwardly presented preferably cylindrical boss or lug 6, the web of member 1 being cut away to accommodate said plate, as seen particularly in Fig. 13. Fixed on the under side, and approximately centrally, of upper member 2, is a corresponding plate or casting 7 having a downwardly presented similar boss or lug 8. Interposed fixedly between members 1 and 2 and at its ends being engaged by and encircling said lugs or bosses 6 and 8, is a preferably tubular center-post or mast 9. Also preferably interposed between, and suitably fixed at their ends to, said frame-members 1 and 2 to each side of post or mast 9, is a plurality of intermediate posts or shaft-supports 10—10', which also serve as struts for the truss chord members 1 and 2, each of said posts or struts being provided intermediate its ends with a suitable shaft-bearing 11. Fixed on center-post 9 in operative alinement with said shaft-bearings 11, is a main shaft-bearing 12 rigidly supported or braced preferably by diagonal or oblique members or bars 13—13 suitably fixed at their lower ends to lower frame-member 1. Extending lengthwise of the frame through said intermediate shaft-bearings 11 and suitably journaled at their inner ends in said main bearing 12 and at their outer ends in bearings 14 fixed to, and at approximately the point of connection between, extensions 3 and 4, are alining shafts 15—15. Adjacent their inner ends, shafts 15—15 are preferably additionally supported by upright bearing-members or posts 16—16 suitably fixed at their lower ends to said brace-bars 13—13.

Main or body-frames A and A are spaced suitably apart, as seen in Fig. 7, and tied or secured rigidly together in approximately parallel relation by an upper main longitudinal connecting-member 17 preferably a T-bar having its web presented upwardly, the webs of frame-members 2 being cut away, as at 18, to accommodate and provide a seat for the ends of bar 17, which are fixed to frame-members 2 in any suitable manner, and by a lower main longitudinal connecting-member 19 also preferably a T-bar having its web presented upwardly, bar 19 at its ends abutting against masts or posts 9 and resting upon, and being fixed in any suitable manner to, said plates 5. Bar 19 at its ends is also preferably fixed to the main or body-frames by diagonal or brace-bars 20, as seen particularly in Fig. 13. Preferably also main or body-frames A and A' are tied rigidly together by a plurality of auxiliary longitudinal T-bars 21 extending lengthwise on opposite sides of main upper connecting bar 17 between, and suitably fixed at their ends to, upper frame-members 2.

Extending lengthwise longitudinally of the craft preferably on opposite sides of the longitudinal center thereof, and fixedly supported in suitable hangers 22—22 fixed to, and depending from, lower frame-members or bars 1, as seen particularly in Figs. 1, 2, and 3, are water-floating vessels, such as pontoons, boats, or the like B—B of any suitable form and construction adapted not only to provide preferably canvas or other fabric-covered cabin or supply-storage accommodations, but also to support the craft as a whole upon a body of water on the order of a hydroplane, hulls 23—23 of boats B, which are preferably of suitable metallic material light in weight, such as, for instance, aluminum, being suitably fixed to hangers 22 and serving also to further rigidly tie main or body-frames A and A' together in operative relation. Suitable means (not shown) to reduce the suction of water upon boats B on the craft rising may, of course, be provided, as will be well understood. It might also be stated that, while not here shown, wheels might be suitably provided on the boats B to form a rolling support for the craft on land.

Suitably fixed at their inner ends to and upon plates 5 and projecting lengthwise oppositely outwardly from frames A and A' in alinement with and being, in effect, extensions of lower longitudinal frame-connecting bar 19, are T-bars 24—24, forming with bar 19 the lower keel of the main hull C of the craft. Preferably also bars 24—24 are fixed to lower frame-members 1 by diagonally disposed brace-bars 25—25, as also seen in Fig. 13.

Sleeved or otherwise mounted to rotatably move on mast or center-post 9 of rear main or body-frame A' intermediate shaft-bearing 12 and plate 7, as seen particularly in Fig. 6, is a tubular member 26 adapted to form the hub of a guiding or steering-rudder D hereinafter more fully described. Also fitted on post 9 of rear frame A' and encircling member or rudder-hub 26, is a suitable ring or collar 27.

Extending longitudinally of the craft and suitably fixed at one end to post 9 of front main or body-frame A and at its other end, by means of an angle member or the like 28, to said ring or collar 27, is a T-bar 29 having its web presented preferably upwardly, bar 29 being spaced upwardly a suitable distance from, and lying in approximately the vertical plane of, lower keel-member 19.

Suitably fixed at its forward end, as by means of an angle-member or the like 30, also to ring or collar 27 and projecting rearwardly from post 9 of rear main-frame A' in alinement with bar 29, is a T-bar extension 31; and suitably fixed at its rear end to post 9 of front frame A and projecting forwardly therefrom also in alinement with bar 29, is a T-bar extension 31', bars 31—31' forming with bar 29 the upper keel or ridge of the main hull C of the craft. Maintaining ring or collar 27 and the bars 29 and 31 fixed thereto rigidly in position properly spaced from lower keel bars 19 and 24, I preferably employ, in addition to other uprights or supports as hereinafter appearing, suitable brackets 32—32' having one end suitably fixed to post 9 of rear frame A' and their other ends to said bars 29 and 31, respectively. Interposed between said upper and lower main hull keel-members, is a plurality of spaced-apart pairs of vertically-disposed strut-members 33—33, the members of each pair having their outer ends suitably fixed to said upper and lower keel-members and their inner ends suitably fixed in cross-shaped joint-members 34, as seen clearly in Fig. 8. Having their inner ends suitably fixed in or to said joint-members 34 and projecting outwardly oppositely therefrom at approximately right-angles to said uprights 33, are hull cross-members 35—35. Preferably each pair of uprights 33—33 is strengthened or braced by oppositely-disposed strut-supported tension-rods 36—36. Also preferably the several pairs of hull uprights 33—33 are tied together and braced by a plurality of diagonally disposed stay- or guy-wires 37, as seen in Fig. 7. Extending lengthwise of the craft and suitably fixed to and upon the outer ends of said hull cross-members 35—35, are longitudinal hull side-members or bars 38—38. Arranged transversely of, and suitably fixed to, said hull upper and lower keel-members and side-members 38—38 between the ends thereof, is a plurality of obliquely disposed wires, bars, or light rods 39 forming the ribs of the hull C, there being any suitable number of such ribs as may be required or desired. Preferably to taper or sharpen the hull C at its opposite ends, the upper and lower keel members and also the side members thereof are provided with converging extensions 40—40, as shown particularly in Fig. 7. Suitably fixed to and surrounding the hull frame-work described is a covering 41 preferably of heavy canvas, and within hull C any suitable flooring may be provided, as will be well understood, hull C being adapted to provide both cabin and supply-storage accommodations, as well as support for the operating machinery of the craft. At the forward end of the craft, a suitable pilot-house 42, as well as an outer deck 43, are preferably provided, deck 43 having support on brackets or the like 44 fixed on the hull frame-work and being adapted for any suitable purpose.

Hull C having substantially throughout its length the approximately rectangular outline or contour shown and being turned on an edge so that its several sides are obliquely disposed to the horizontal, it will be evident that the same tends greatly to the buoyancy of the craft, the oblique under sides thereof serving substantially as planes to catch the currents of air and greatly increasing the quick rising and flying qualities of the craft. Furthermore, hull C being suitably securely tied to the main frame-work by means of wires or the like 44', of which there may be any suitable or required number, it will be seen that the main or body-portion of my new craft is of strong, substantially rigid construction capable of carrying considerable loads, depending, of course, upon the speed at which the craft is driven while in flight and the area or spread and strength of the wings or planes of the craft now to be described.

Extending approximately end to end transversely of and across the craft and within each main or body-frame A and A', as seen clearly in Figs. 3 and 4, is a pair of what might be called double or superposed vane or box-shaped approximately rectangular fixed lifting and sustaining wings E—E having preferably a fixed angle of incidence of approximately 4° to the horizontal and having preferably a considerably greater length than breadth, as will be noted. Each of these wings E is substantially of ordinary wing construction comprising an approximately rectangular box-shaped skeleton frame made up of longitudinal members 45, cross members 46, and upright members 47 suitably fixed and also tied, as by means of a plurality of stray or guy wires 48, together. Each wing E also, as will be understood and as shown, may include a plurality of intermediate longitudinal and cross members, as well as interior upright members 47 and series of guy or stay-wires 48, it being only required in my craft that each wing E be lengthwise or longitudinally thereof centrally from approximately intermediate post 10 to the outer end thereof free from such intermediate members to provide an open space therein, as at $f$, for a pair of elevating planes or rudders F—F shortly to be described oscillatorily movable in each wing E. Suitably stretched and secured on both the under and top faces of said frame, are wing surfaces of canvas or other suitable fabric 49—49 cut-away, as at 50, above and below said rudder-space $f$ so as to more readily permit elevating planes or rudders F to catch the currents of air and thereby, on proper oscillation thereof, serve to cause the craft to rise or descend. Each wing E is fixed to the frame-work of the craft at its other end by suitable diagonal members 51 having fixed rigid connection with the main frame-members 1 and 2 and at its inner end, as seen in Fig. 8 particularly, has fixed support upon the rigid frame-work of hull C. Each wing E is also preferably tied to frame-members 1 and 2 by guy or stay-wires 52, of which there may be any suitable number.

Disposed lengthwise transversely of the craft within the described open space $f$ of each wing E and suitably fixed on shaft 15 so as to simultaneously oscillatorily move when said shaft is rotatably actuated, is a pair of said elevating planes or rudders F—F similarly arranged approximately end to end, one plane or rudder F of a pair being located on shaft 15 between posts 10 and 10' and the other plane or rudder F of the pair being located on the shaft 15 between post 10' and the side-extensions 3—4 of main frame-members 1 and 2, as seen especially in Figs. 1, 2, and 4. Each plane or rudder F may be of any suitable or approved form and construction and may be here briefly described as comprising a preferably rectangular frame 53 having a tubular center member or hub 54 fitting on, and feathered or otherwise fixed to, shaft 15, frame 53 extending lengthwise of shaft 15 and being covered on both opposite faces by sections of canvas or other suitable fabric 55—55. Preferably each frame 53 is strengthened to resist strains by transversely disposed strut-supported truss-rods 56. Both forward and rear sets of planes or rudders F, each set comprising four or two pairs of planes or rudders as described, the pairs of each set being disposed on opposite sides of the center-post or mast 9 of the particular main or body-frame, normally are approximately horizontally disposed and parallel with the vanes or planes of the wing E. Preferably also the forward and rear pairs of planes or rudders F on each side of the center-posts or masts 9 are oscillatorily movable in unison or simultaneously transversely of the direction of flight of the craft, these planes or rudders F being adapted, as will be well understood, to control the rising and descending movements of the craft and also to maintain the lateral balance or equilibrium of the craft while in flight. To oscillatorily move or vary the angle of incidence of the forward and rear pairs of rudders or planes F on one side of the masts 9 of the main or body-frames of the craft, any suitable means may be provided, as will be evident; for such purpose, however, I preferably employ and have herein shown (see particularly Fig. 19) a pivoted lever 57 working in a sector 58 located in pilot-house 42 or other suitable point in hull C, lever 57 having pivoted connection at one end with a preferably trussed elongated link 59. At its opposite end, link 59 has pivoted connection with one end of a substantially similar link 60 and also with one end of an arm 61 fixed at its other end to one shaft 15. Second link 60 at its free end also has pivoted connection with a second arm 62 fixed to the other shaft 15. Thus, on lever 57 being pivotally actuated in its sector 58, planes or rudders F on one side of the longitudinal axis of the craft will be oscillated for the purposes stated, said planes or rudders F being in their said normal or neutral position when lever 57 is in its normal position or in the central position thereof seen in Fig. 19. To oscillatorily actuate the pairs of planes or rudders F on the other side of the craft, a duplication of said actuating means is provided.

Located centrally at the rear of the craft is a fixed lifting and sustaining tail-wing G, seen particularly in Figs. 2, 3, and 4. This wing or plane G may also be of any suitable or approved construction and may be described as comprising an approximately rectangular frame 63 disposed horizontally of the craft slightly above the plane of the rear end of hull C, frame 63 being rigidly secured in its described position by upstanding members or sticks 64 and numerous guy or stay wires 65 having engagement with the frame-work of hull C. Stretched on and over both faces of frame 63 are sections of canvas or other suitable fabric 66. It might here be observed that deck 43 at the front end of the craft serves also as a wing or plane, balancing tail-wing G and thereby tending to preserve the lengthwise or longitudinal equilibrium of the craft.

Stretched lengthwise across the craft from main-frame A to main-frame A' immediately over, and suitably secured to, frame-members 2 and said longitudinal frame-connecting bars 17 and 21, and forming the lower vane or plane of a double-vane main lifting and sustaining wing H, is a section of canvas or the like 67, this canvas section at its side edges terminating preferably approximately midway between posts 10 and 10' of the main-frames. Fixed at their lower ends to, and upstanding from, frame-members 2 and said bars 17 and 21, is a plurality of sticks or spars 68 preferably tied together and braced by diagonal stay or guy wires 69. Supported on posts 68 is a preferably centrally crowned or arched frame 70 disposed lengthwise over the craft from frame A to frame A' and terminating at its side edges approximately above, or in the vertical plane of, outer posts 10' of the main or body-frames of the craft. Stretched over and suitably fixed to this frame 70 and forming the upper or superposed plane of main sustaining wing H, is a covering of canvas or other suitable fabric 71, frame 70 being strengthened by intermediate ribs, as will be understood. As also seen in Fig. 3, posts or sticks 68 are preferably of gradually decreasing length from forward main-frame A to rear main-frame A′, whereby consequently upper or superposed plane of main wing H has also a fixed angle of incidence downwardly and rearwardly of approximately 4° to the horizontal.

Having its rear end mounted to rotatably move in suitable bearing-arms or brackets 73 fixed on center-post or mast 9 of front main or body-frame A adjacent the upper end thereof and projecting forwardly therefrom longitudinally of the craft, is a shaft 74 having its outer end journaled in a suitable bearing 75 of a bracket-arm 76 having fixed support on, and projecting obliquely forwardly and upwardly from, said mast or post 9. Extending lengthwise transversely of the craft and fixed to oscillatorily move from side to side laterally or transversely of the craft as shaft 74 is rotatably actuated, is a normally approximately horizontally disposed balancing plane or rudder, as I have termed it, J. This plane or rudder J, as more clearly seen in Figs. 9 and 10, comprises an approximately rectangular canvas or other fabric covered frame 77 having a center member or hub 78 sleeved, and feathered or otherwise fixed, on shaft 74. Frame 77 is preferably both lengthwise and crosswise strengthened to resist strains by suitable preferably strut-supported truss-rods or wires 79—80 and is permanently so diagonally warped or twisted throughout its area as to be higher at diagonally opposite corners *a—a* than at diagonally opposite corners *b—b*, rudder or plane J being thereby adapted to more readily catch and be acted on by the currents of air, so that, in maintaining the lateral balance or equilibrium of the craft, the craft may be sensitive and quickly respond to oscillatory movements thereof. To further strengthen frame 77 in its so warped or twisted condition, I preferably also employ, as shown in Fig. 9, diagonally disposed brace-wires or light rods 81. While it is to be understood that shaft 74 may be rotatably moved and hence rudder or plane J oscillatorily actuated by any suitable means, I preferably, for such purpose, fixedly provide on shaft 74 a sheave or drum 82 having connection through a flexible cable or rope 82′ with a corresponding sheave or drum on a suitable tiller-wheel (not shown) located suitably within the hull C of the craft, rotatory movement of said tiller-wheel controlling the rotary movements of shaft 74 and consequently also the oscillatory movements of rudder or plane J, as will be clear, whereby plane or rudder J may be readily oscillated as required from side to side laterally or transversely of the craft to preserve and maintain the lateral equilibrium and stability thereof while in flight.

The guiding or steering rudder D of the craft, which has been hereinbefore mentioned and which is throughout its area approximately vertically disposed relatively to the craft, comprises, with said tubular member 26 as its hub or axis, a suitable canvas or other fabric covered frame 83 having preferably the polygonal form or contour seen in side elevation in Fig. 3, frame 83 and its hub-portion 26 being strengthened and braced to resist strains by means of suitable diagonally disposed wires 84 and also by preferably strut-supported truss-wires or rods 85, as also seen in Fig. 2. This rudder D is preferably of such relative size as to extend rearwardly from main or body-frame A′ to closely adjacent the rear end of hull C and forwardly from main or body-frame A′ somewhat beyond the front edge of rear sustaining wings E, as seen clearly in Fig. 3, rudder D being located and swingable transversely of the craft in a plane above said rear sustaining wings E and tail-wing H. While it is also to be understood that rudder D may be swingably actuated as required by any suitable means to guide the craft in its flight, I preferably for this purpose fixedly mount on member or hub 26 a suitable sheave or drum 86, as indicated in Fig. 18, having connection through a suitable flexible cable or rope 87 with a corresponding drum or sheave 88 fixed on a suitable tiller-wheel 89 conveniently located within hull C of the craft, whereby, as wheel 89 is rotatably actuated in one or the other direction, rudder D may be swung from side to side transversely of the craft to direct or guide the craft in its flight.

To propel the craft, I preferably employ a plurality of suitable propellers, five being here shown (although it is to be understood that a greater or less number thereof might be employed, as may be desired or required), namely, a main propeller P arranged centrally at the rear of the craft, as clearly seen in Fig. 2, and secondary or auxiliary propellers P′ arranged approximately in tandem pairs at the sides of hull C, as clearly seen in Fig. 3, fixed, respectively, upon suitable shafts 90 projecting obliquely rearwardly and downwardly from, and arranged for rotary movement in suitable hangers 91 fixed to the framework of, hull C. Propellers P and P′ may be of any approved form and construction, but are preferably each, to increase the driving power thereof, specially constructed, as specifically shown in Figs. 21, 22, and 23, to comprise a central portion or hub 92, a pair of oppositely disposed relatively long blades 93—93, and a pair of oppositely disposed shorter blades 94—94, said pairs of blades being tied approximately rigidly together and reinforced by numerous stay or brace-wires 95. Each of said blades is also preferably lengthwise somewhat bowed or convexed and warped or twisted as shown, each blade at its base or inner end being crosswise preferably obliquely disposed to the face of hub 92. The blades of each of said pairs are also provided or formed with oppositely disposed outwardly projecting lateral portions or extensions 93ª—93ª and 94ª—94ª, respectively. Propellers P and P' having the form and construction described and the respective propeller-shafts 90 thereof having the inclination stated, each of said propellers is, or, as it might be said, has a plane of rotation, obliquely disposed to the horizontal with each blade thereof for the greater part of its length, and particularly at its said lateral portion, working in a separate orbit or rotary path of travel from the other, the efficiency and driving or pushing power of the propeller upon the air being accordingly greatly increased. Propellers P and P', it may be observed, are driven by suitable engines (not shown) located suitably within hull C and properly distributed with respect to the center of gravity thereof.

The operation of air-craft and the uses to which the same may be put are today so well generally known and understood that a further detailed description thereof as applicable to my new air-craft is not deemed necessary or required here; suffice it to say that I provide, by the construction described, an exceedingly buoyant, serviceable, heavier-than-air craft which, while capable of carrying, and especially designed to carry, considerable loads, affords speed, safety, and steadiness, and which may be efficiently readily controlled, in flight. I might add that substantially all parts of the main frame-work and body-portion of my craft are of suitable metallic material, such as, for instance, aluminum, possessing strength and rigidity with lightness, the spars, ribs, and frames of the several wings and rudders being preferably of wood having the necessary strength combined with lightness and some flexibility.

I am aware that changes in the form, construction, arrangement, and combination of the several parts of my new air-craft may be made and substituted for those herein shown and described without departing from the nature and principle of my invention.

Having thus described my invention, what I claim and desire to secure by Letters Patent is:

1. An air-craft including a substantially rigid elongated open body-frame disposed vertically transversely of the craft, a second substantially rigid elongated open body-frame also disposed vertically transversely of the craft, but at a distance longitudinally of the craft from said first frame, each of said body-frames being of truss construction and comprising upper and lower chords fixed together at their ends and a strut extending between and fixed at its ends to said chords, bars disposed longitudinally of the craft having fixed connection with said chords and rigidly tying said frames together in spaced-apart approximately parallel relation, and sustaining-wing-frames rigidly connected to said body-frames, said wing-frames being disposed through and at an angle to the vertical planes of said frames intermediate the upper and lower chords thereof.

2. An air-craft including a pair of substantially rigid elongated open body-frames disposed vertically transversely of the craft, said frames being fixed together in spaced-apart approximately parallel relation, elongated sustaining-wing-frames rigidly connected to said body-frames, each of said wing-frames lengthwise extending transversely of the craft and being disposed through the area, and at an angle to the vertical plane, of its respective body-frame, a hull having its frame-work rigidly fixed and supported on said body-frames, said hull projecting lengthwise longitudinally of the craft with its longitudinal center on a plane extending transversely through the areas, respectively, of said body-frames, and a main-sustaining wing fixed upon both said body-frames and lying in a plane above said wing-frames and hull, said main wing covering space longitudinally of the craft between said wing-frames.

3. An air-craft comprising a pair of substantially rigid elongated open body-frames disposed vertically transversely of the craft, said frames being fixed together in spaced-apart approximately parallel relation and each including a lower chord, a center-bar disposed longitudinally of the craft, said bar having fixed connection with said chords, and a hull projecting lengthwise longitudinally and centrally of the craft with its frame-work rigidly fixed to said frames, said center-bar forming the keel of said hull.

4. An air-craft including a pair of substantially rigid elongated spaced-apart approximately parallel body-frames disposed laterally of the craft, each frame being of truss construction and comprising upper and lower chords having fixed connection together at their ends, and a center strut extending between and fixed at its opposite ends to said chords, and a hull having a substantially rigid frame-work approximately throughout its length rectangular in outline in cross-section supported and fixed on said frames, said hull extending lengthwise through said frames longitudinally and centrally of the craft with its sides obliquely disposed to the horizontal, substantially as described.

5. An air-craft including a pair of substantially rigid elongated spaced-apart approximately parallel body-frames disposed laterally of the craft, each frame being of truss construction and comprising upper and lower chords having fixed connection together at their ends, and a center strut extending between and fixed at its opposite ends to said chords, and a hull having a fabric-covered substantially rigid framework tapering at its ends and approximately throughout its length rectangular in cross-section supported and fixed on said frames and tying said frames rigidly together, said hull extending lengthwise through and beyond said frames longitudinally and centrally of the craft with its sides obliquely disposed to the horizontal, substantially as described.

6. An air-craft including a substantially rigid elongated open body-frame disposed vertically transversely of the craft, said frame being of truss construction and comprising upper and lower chords having fixed connection together at their ends, and a strut extending between and fixed at its ends to, said chords, and an elongated approximately rectangular sustaining wing rigidly fixed to, and extending lengthwise transversely of the craft through and across the area inclosed by, said frame, said wing comprising superposed approximately parallel members, the plane of each of which is at angle to the vertical plane of said frame.

7. An air-craft including a substantially rigid elongated body-frame disposed transversely of the craft, said frame being of truss construction and comprising upper and lower chords having fixed connection together at their ends, and a center strut extending between and fixed at its opposite ends to said chords, an elongated approximately rectangular sustaining wing comprising superposed planes lengthwise disposed transversely of the craft within and fixed to said frame, and an elevating oscillatory plane lengthwise disposed transversely of the craft, said plane being pivoted within said frame intermediate the planes of said wing; substantially as described.

8. An air-craft including a substantially rigid elongated body-frame disposed transversely of the craft, said frame being of truss construction and comprising upper and lower chords having fixed connection together at their ends, and a center strut extending between and fixed at its opposite ends to said chords, an elongated approximately rectangular sustaining wing comprising superposed planes lengthwise disposed transversely of the craft within and fixed to said frame, and an elevating oscillatory plane lengthwise disposed transversely of the craft and pivoted within said frame intermediate the planes of said wing, said elevating plane being oscillatory transversely of the direction of flight and the planes of said wing being cut away longitudinally thereof above and below said elevating plane, substantially as described.

9. An air-craft including a substantially rigid elongated body-frame disposed transversely of the craft, said frame being of truss construction and comprising upper and lower chords having fixed connection together at their ends, and a center strut extending between and fixed at its opposite ends to said chords, an elongated approximately rectangular sustaining wing comprising superposed planes lengthwise disposed transversely of the craft within and fixed to said frame, and a plurality of elevating oscillatory planes lengthwise disposed approximately end to end transversely of the craft and pivoted within said frame intermediate the planes of said wing, said elevating planes being oscillatory simultaneously transversely of the direction of flight and the planes of said wing being cut away longitudinally thereof above and below said elevating planes, substantially as described.

10. An air-craft including a substantially rigid elongated body-frame disposed transversely of the craft, said frame being of truss construction and comprising upper and lower chords having fixed connection together at their ends, and a center-post interposed between and fixed at its opposite ends to said chords, a pair of elongated approximately rectangular sustaining wings each comprising superposed planes lengthwise fixed transversely of the craft within said frame on opposite sides of said post, and a plurality of pairs of elevating oscillatory planes lengthwise disposed transversely of the craft and pivoted within said frame intermediate the planes of said wings, the elevating planes of each of said pairs being oscillatory simultaneously transversely of the direction of flight and the planes of said wings being cut away longitudinally thereof above and below said elevating planes, substantially as described.

11. An air-craft including a substantially rigid elongated body-frame disposed transversely of the craft, said frame being of truss construction and comprising upper and lower chords having fixed connection together at their ends, and a center-post interposed between and fixed at its opposite ends to said chords, a pair of elongated approximately rectangular sustaining wings each comprising superposed planes lengthwise fixed transversely of the craft within said frame on opposite sides of said post, a plurality of pairs of oscillatory planes lengthwise disposed transversely of the craft and pivoted within said frame intermediate the planes of said wings, the elevating planes of each of said pairs being oscillatory simultaneously transversely of the direction of flight and the planes of each of said wings being cut away longitudinally thereof above and below said elevating planes, and means for oscillating said pairs of elevating planes, substantially as described.

12. An air-craft including a pair of substantially rigid elongated body-frames disposed transversely of the craft and rigidly fixed in spaced apart approximately parallel relation, each of said frames being of truss construction and comprising upper and lower chords having fixed connection together at their ends and a center-post interposed between and fixed at its opposite ends to said chords, a pair of elongated approximately rectangular sustaining wings each comprising superposed planes lengthwise fixed transversely of the craft within each of said frames on opposite sides of the center-post thereof, a plurality of pairs of oscillatory planes lengthwise disposed transversely of the craft and pivoted within the respective frames intermediate the planes of each of said wings, the planes of each of said pairs being oscillatory simultaneously transversely of the direction of flight and the planes of each of said wings being cut-away longitudinally thereof above and below said oscillatory planes, and means for oscillating the several pairs of oscillatory planes, substantially as described.

13. An air-craft including a substantially rigid elongated open body-frame disposed vertically transversely of the craft, said frame being of truss construction and comprising upper and lower chords having fixed connection together at their ends and a center strut extending between and fixed at its opposite ends to said chords, and an oscillatory plane pivoted within, and projecting normally across, with its side edges lying on opposite sides of, the vertical plane of, said frame, said plane being lengthwise disposed within said frame transversely of the craft and oscillatory transversely of the direction of flight; substantially as described.

14. An air-craft including a substantially rigid elongated open body-frame disposed vertically transversely of the craft, said frame being of truss construction and comprising upper and lower chords having fixed connection together at their ends and a center strut extending between and fixed at its opposite ends to said chords, and a pair of approximately rectangular oscillatory planes pivoted within said frame and each lengthwise disposed transversely of the craft and oscillatory transversely of the direction of flight, each of said planes projecting normally across, with its side edges lying on opposite sides of, the vertical plane of said frame; substantially as described.

15. An air-craft including a substantially rigid elongated open body-frame disposed vertically transversely of the craft, said frame being of truss construction and comprising upper and lower chords having fixed connection together at their ends and a center strut extending between and fixed at its opposite ends to said chords, and a plurality of pairs of approximately rectangular oscillatory planes pivoted within said frame and each plane being lengthwise disposed transversely of the craft and oscillatory simultaneously transversely of the direction of flight, the planes of each of said pairs projecting normally across, with their side edges lying on opposite sides of, the vertical plane of said frame, substantially as described.

16. An air-craft including a substantially rigid elongated open body-frame disposed vertically transversely of the craft, said frame being of truss construction and comprising upper and lower chords having fixed connection together at their ends and a center strut extending between and fixed at its opposite ends to said chords, a plurality of pairs of approximately rectangular oscillatory planes pivoted within said frame and each plane being lengthwise disposed transversely of the craft and oscillatory simultaneously transversely of the direction of flight, the planes of each of said pairs projecting normally across, with their side edges lying on opposite sides of, the vertical plane of said frame, and means for oscillating said pairs of planes, substantially as described.

17. In an air-craft, a body-portion comprising a pair of substantially rigid elongated open truss frames rigidly fixed together in spaced apart relation longitudinally of the craft, each of said frames being disposed vertically transversely of the craft and each including upper and lower chords spaced vertically apart approximately throughout their length, sustaining-wings each comprising superposed planes fixed to each of said frames, and a main sustaining-wing also comprising superposed planes fixed upon said frames vertically above the planes of said first-named sustaining-wings and covering space longitudinally of the craft between said first-named sustaining-wings, said first-named sustaining wings projecting through, and at an angle to, each of said frames intermediate the said chords thereof.

18. An air-craft comprising a body-portion including a pair of substantially rigid elongated frames disposed vertically transversely of the craft and rigidly fixed together in spaced apart approximately parallel relation, each frame being of truss construction and comprising upper and lower chords having fixed connection together at their ends and a center strut extending between and fixed at its opposite ends to said chords, and an enlarged sustaining wing having superposed planes fixed upon the upper chords of, and covering space between, said frames, the planes of said wing being gently arched laterally of the craft, substantially as described.

19. An air-craft comprising a body-portion including a pair of substantially rigid elongated frames disposed vertically transversely of the craft and rigidly fixed together in spaced apart approximately parallel relation, each frame being of truss construction and comprising upper and lower chords having fixed connection together at their ends and a center strut extending between and fixed at its opposite ends to said chords, and an enlarged sustaining wing having superposed planes of different area fixed upon the upper chords of, and covering space between, said frames, the upper plane of said wing projecting at its marginal edges beyond, and being larger in area than, the lower plane thereof, substantially as described.

20. In an air-craft, the combination with a rigid body-portion, said body-portion including a pair of transversely disposed frame-members, each being of truss construction and comprising upper and lower chords having fixed connection together at their ends and a center strut extending between and fixed at its opposite ends to said chords, of an elongated hull having a rigid-frame-work disposed longitudinally of the craft, and fixed to the lower chords of said frame-members, and a plane disposed approximately horizontally of the craft at the rear thereof above said hull, said plane having fixed support on said hull frame-work; substantially as described.

21. An air-craft including a substantially rigid elongated open body-frame disposed vertically transversely of the craft, a second substantially rigid elongated open body-frame also disposed vertically transversely of the craft, but at a distance longitudinally of the craft from said first frame, each of said body-frames being of truss construction and comprising upper and lower chords fixed together at their ends and a strut extending between and fixed at its ends to said chords, connecting-bars disposed longitudinally of the craft having fixed connection with said chords and rigidly tying said frames together in spaced apart relation, and elongated sustaining-wing-frames rigidly connected to said body-frames, each of said wing-frames lengthwise extending transversely of the craft and being disposed through and at an angle to the vertical plane of its respective body-frame intermediate the upper and lower chords thereof.

22. An air-craft including a substantially rigid elongated open body-frame disposed vertically transversely of the craft, a second substantially rigid elongated open body-frame also disposed vertically transversely of the craft, but at a distance longitudinally of the craft from said first frame, each of said body-frames being of truss construction and comprising upper and lower chords fixed together at their ends and a strut extending between and fixed at its ends to said chords, bars connecting said frames together rigidly in spaced apart relation, elongated sustaining-wing-frames rigidly connected to said body-frames, each of said wing-frames lengthwise extending transversely of the craft and being disposed through and at an angle to the vertical plane of its respective body-frame intermediate the upper and lower chords thereof, and a main sustaining-wing fixed upon said body-frames, said main wing lying in a plane above said first wing-frames and covering space longitudinally of the craft therebetween.

23. In an air-craft, the combination with a body-portion, said body-portion including a frame of truss construction and comprising upper and lower chords and a center-post extending between and fixed at its opposite ends to said chords, of a shaft projecting forwardly from said post, said shaft being arranged for rotary movement in bearings supported on said post, a wing fixed on said shaft and oscillatory therewith from side to side laterally of the craft, and means for oscillating said shaft and wing; substantially as described.

In testimony whereof, I have signed my name to this specification, in the presence of two subscribing witnesses.

ARCHIEBALD L. McKELVEY.

Witnesses:
 IRENE M. BOHANNON,
 S. J. BERNHEIMER.